United States Patent
Tickner et al.

(10) Patent No.: US 10,168,026 B1
(45) Date of Patent: Jan. 1, 2019

(54) UNDER CABINET LIGHT FIXTURES

(71) Applicant: COOPER TECHNOLOGIES COMPANY, Houston, TX (US)

(72) Inventors: Jerold Alan Tickner, Newnan, GA (US); Nicolas Zamora, Newnan, GA (US); Michael Troy Winslett, Fairburn, GA (US); Adam Foy, Parker, CO (US)

(73) Assignee: Cooper Technologies Company, Houston, TX (US)

( * ) Notice: Subject to any disclaimer, the term of this patent is extended or adjusted under 35 U.S.C. 154(b) by 128 days.

(21) Appl. No.: 14/702,055

(22) Filed: May 1, 2015

(51) Int. Cl.
| F21S 8/00 | (2006.01) |
| F21V 15/015 | (2006.01) |
| F21V 7/04 | (2006.01) |
| F21V 23/06 | (2006.01) |

(52) U.S. Cl.
CPC .............. *F21V 15/015* (2013.01); *F21V 7/04* (2013.01); *F21V 23/06* (2013.01)

(58) Field of Classification Search
CPC ........... F21S 8/04; F21S 8/036; F21V 15/015; F21V 17/107; F21V 21/005
USPC .............. 362/33, 95, 133, 221, 223, 249.05, 362/249.12
See application file for complete search history.

(56) References Cited

U.S. PATENT DOCUMENTS

| 4,383,289 A * | 5/1983 | Lewin | F21V 7/04 362/216 |
| 4,758,180 A * | 7/1988 | Wills | H05K 7/14 174/666 |
| 5,530,628 A * | 6/1996 | Ngai | F21V 5/02 362/127 |
| 6,431,722 B1* | 8/2002 | Benensohn | A47B 97/00 362/133 |
| 6,796,684 B1* | 9/2004 | Beadle | F21S 8/024 362/287 |
| 7,824,055 B2* | 11/2010 | Sherman | A47F 5/0043 362/125 |
| 2003/0161148 A1* | 8/2003 | Soorus | F21S 8/00 362/221 |
| 2007/0127244 A1* | 6/2007 | Cunius | F21V 15/013 362/260 |
| 2008/0289873 A1* | 11/2008 | Herring | H05K 5/0217 174/520 |

* cited by examiner

*Primary Examiner* — Evan Dzierzynski
*Assistant Examiner* — Keith G Delahoussaye
(74) *Attorney, Agent, or Firm* — King & Spalding LLP

(57) ABSTRACT

An end cap for a light fixture is described herein. The end cap can include a body having at least one wall and at least one coupling feature, where the at least one wall has an inner surface and an outer surface, and where the at least one coupling feature is configured to couple the body to another component of the light fixture. The end cap can also include a first knockout disposed in the at least one wall, where the first knockout is configured to be removed to generate a first aperture in the at least one wall, where the first aperture is configured to receive a first electrical enclosure. The end cap can further include a second knockout disposed in the at least one wall, where the second knockout is configured to be removed to generate a second aperture in the at least one wall.

14 Claims, 12 Drawing Sheets

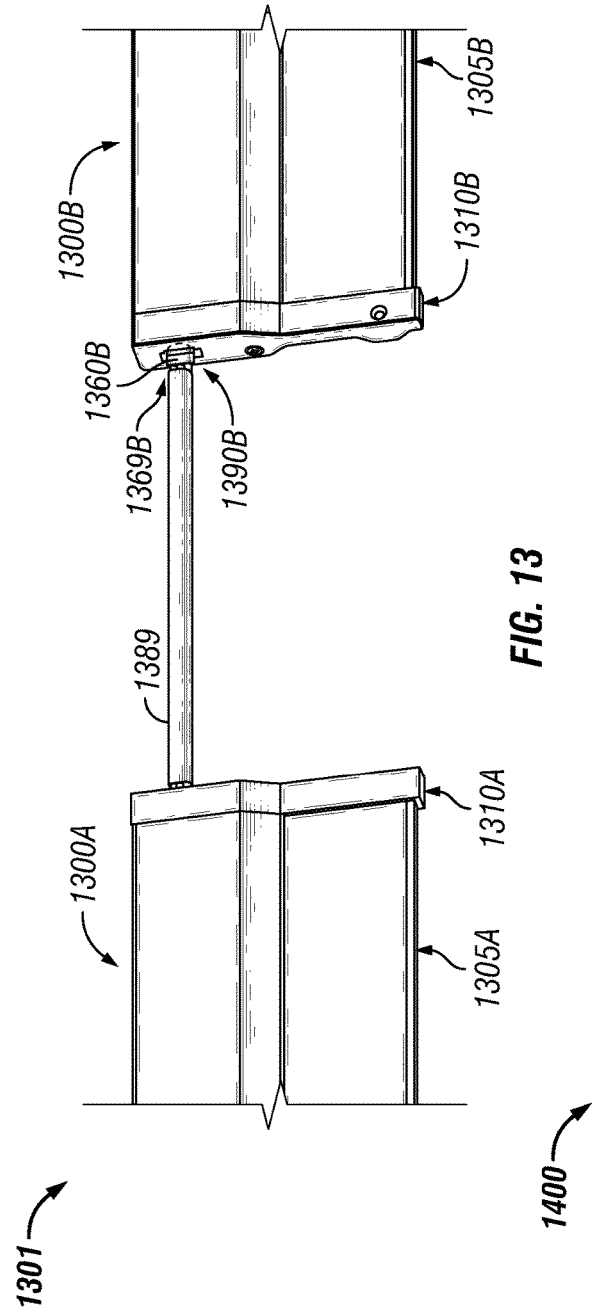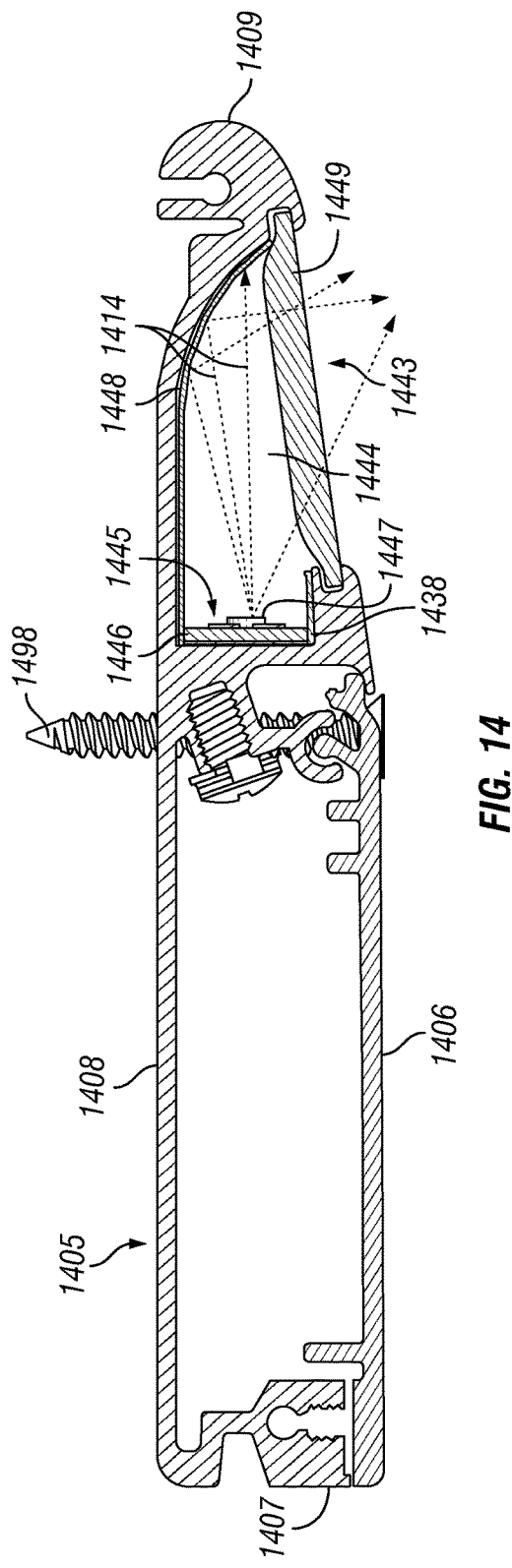

UNDER CABINET LIGHT FIXTURES

TECHNICAL FIELD

Embodiments described herein relate generally to light fixtures, and more particularly to systems, methods, and devices for light fixtures mounted under a cabinet.

BACKGROUND

In certain applications, the size and shape of a light fixture can be constrained. For example, in a kitchen setting, a user may want one or more light sources mounted under cabinetry. However, because of clearance concerns (such as a user's ability to work and/or store items on a counter under the cabinetry), aesthetics, and/or any of a number of other considerations, any light fixtures mounted to the underside of the cabinetry will be constrained. A light fixture mounted to an underside of a cabinet can be called an under cabinet light fixture. When multiple light fixtures are used in such an application, these light fixtures can share a common source of power and/or control signals.

SUMMARY

In general, in one aspect, the disclosure relates to an end cap for a light fixture. The end cap can include a body having at least one wall and at least one coupling feature, where the at least one wall comprises an inner surface and an outer surface, and where the at least one coupling feature is configured to couple the body to another component of the light fixture. The end cap can also include a first knockout disposed in the at least one wall, where the first knockout is configured to be removed to generate a first aperture in the at least one wall, where the first aperture is configured to receive a first electrical enclosure. The end cap can further include a second knockout disposed in the at least one wall, where the second knockout is configured to be removed to generate a second aperture in the at least one wall, where the second aperture is configured to receive a second electrical enclosure.

In another aspect, the disclosure can generally relate to an under cabinet light fixture. The under cabinet light fixture can include a main housing having a body, and a first end cap disposed on a first end of the main housing. The first end cap of the under cabinet light fixture can include a body having at least one wall and at least one coupling feature, where the at least one wall comprises an inner surface and an outer surface, and where the at least one coupling feature is coupled to the body to the main housing. The first end cap of the under cabinet light fixture can also include a first knockout disposed in the at least one wall, where the first knockout is configured to be removed to generate a first aperture in the at least one wall. The first end cap of the under cabinet light fixture can further include a second knockout disposed in the at least one wall, where the second knockout is configured to be removed to generate a second aperture in the at least one wall.

In yet another aspect, the disclosure can generally relate to an under cabinet light fixture. The under cabinet light fixture can include a main housing and a light chamber disposed within the main housing. The light chamber of the under cabinet light fixture can include at least one light module, where each light module of the at least one light module has at least one light source. The light chamber of the under cabinet light fixture can also include at least one reflective surface that defines a portion of the light chamber. The light chamber of the under cabinet light fixture can further include an opening positioned adjacent to the at least one reflective surface, where at least a portion of light emitted by the at least one light source is reflected off the at least one reflective surface through the opening and into an ambient environment outside the main housing.

These and other aspects, objects, features, and embodiments will be apparent from the following description and the appended claims.

BRIEF DESCRIPTION OF THE DRAWINGS

The drawings illustrate only example embodiments of under cabinet light fixtures and are therefore not to be considered limiting of its scope, as under cabinet light fixtures may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

FIG. 13 shows a couple of under cabinet light fixtures coupled to each other in accordance with certain example embodiments.

FIG. 14 shows an under cabinet light fixture with a light chamber in accordance with certain example embodiments.

DETAILED DESCRIPTION OF EXAMPLE EMBODIMENTS

Figure 1A:
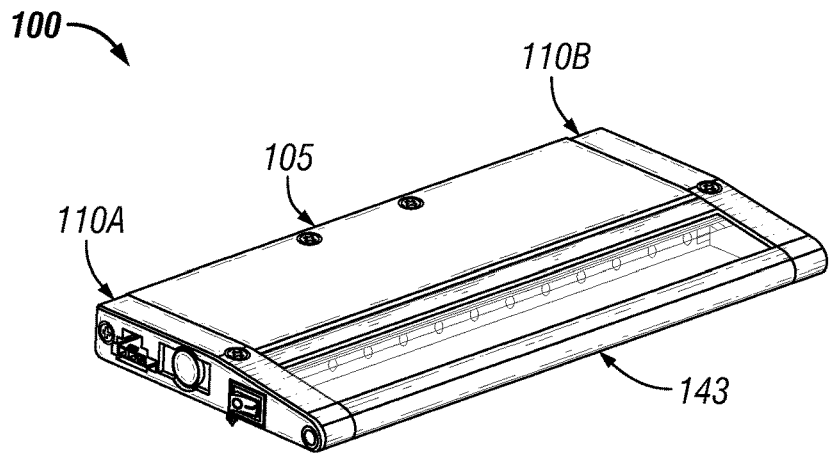
FIGS. 1A-1C show various views of an example under cabinet light fixture in accordance with certain example embodiments.

The example embodiments discussed herein are directed to systems, apparatuses, and methods for under cabinet light fixtures. Such under cabinet light fixtures can have one or more of a number of types of socket into which one or more light sources are electrically and mechanically coupled. Examples of types of sockets can include, but are not limited to, an Edison screw base of any diameter (e.g., E26, E12, E 14, E39), a bayonet style base, a bi-post base, a bi-pin connector base, a wedge base, and a fluorescent tube base. A light source of an example under cabinet light fixture can electrically and mechanically couple to the socket and can be of a light source type that corresponds to the type of socket. Examples of light source types of the light source can include, but are not limited to, light-emitting diodes (LEDs), incandescent lamps, halogen lamps, G10/GU10, G9/GU9, AR111/PAR36, T3, MR-11, and MR-16. If the light source of an under cabinet light fixture is a LED, the LED can be of one or more of a number of types of LED technology, including but not limited to discrete LEDs, LED arrays, chip-on-board LEDs, edge lit LED panels, and surface mounted LEDs.

An example under cabinet light fixture (also more simply called a light fixture herein) can be mounted in spaces with relatively low clearance, such as on the bottom of a cabinet in a kitchen. Alternatively, example under cabinet light fixtures described herein can be used in other applications where clearance is not at issue. An under cabinet light fixture can be electrically coupled to a power source to provide power and/or control to the light fixture. The power source can provide the under cabinet light fixture with one or more of a number (and/or a range) of voltages, including but not limited to 120 V alternating current (AC), 110 VAC, 240 VAC, 24 V direct current (DC), and 0-10 VDC.

Such under cabinet light fixtures can be of any size and/or shape, and can have any number of sockets. Such under cabinet light fixtures can be located indoor and/or outdoors and can be mounted to a surface (e.g., cabinet, wall, ceiling, pillar), be part of a lamp, or be used with any other suitable mounting instrument. Such under cabinet light fixtures can be used in residential, commercial, and/or industrial applications. Such under cabinet light fixtures can operate from a manual fixture (e.g., on/off switch, dimming switch, pull chain), a photocell, a timer, and/or any other suitable mechanism.

Any components (e.g., end cap) of example under cabinet light fixtures, or portions thereof, described herein can be made from a single piece (as from a mold, injection mold, die cast, or extrusion process). In addition, or in the alternative, a component (or portions thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, and/or perform other functions aside from merely coupling. In addition, each component and/or feature described herein (including each component of an example under cabinet light fixture) can be made of one or more of a number of suitable materials, including but not limited to metal, ceramic, rubber, and plastic.

A coupling feature (including a complementary coupling feature) as described herein can allow one or more components and/or portions of an under cabinet light fixture (e.g., an end cap) to become mechanically and/or electrically coupled, directly or indirectly, to another portion (e.g., a main housing) of the under cabinet light fixture. A coupling feature can include, but is not limited to, a clamp, a portion of a hinge, an aperture, a recessed area, a protrusion, a slot, a spring clip, a tab, a detent, and mating threads. One portion of an example under cabinet light fixture can be coupled to another portion of the under cabinet light fixture by the direct use of one or more coupling features.

In addition, or in the alternative, a portion of an example under cabinet light fixture can be coupled to another portion of the under cabinet light fixture using one or more independent devices that interact with one or more coupling features disposed on a component of the under cabinet light fixture. Examples of such devices can include, but are not limited to, a pin, a hinge, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

In certain example embodiments, the under cabinet light fixtures (or portions thereof) described herein meet one or more of a number of standards, codes, regulations, and/or other requirements established and maintained by one or more entities. Examples of such entities include, but are not limited to, Underwriters' Laboratories (UL), the National Electric Code (NEC), and the Institute of Electrical and Electronics Engineers (IEEE). For example, UL may require that wiring (also called electrical conductors, as defined below) that electrically couples to an example under cabinet light fixture cannot be removed by pulling on such wiring from outside the under cabinet light fixture. As another example, example under cabinet light fixtures can comply with the Restriction of Hazardous Substances (ROHS) Specification CL-ES-1025.

As defined herein, an electrical enclosure is any type of connector or housing inside of which is disposed electrical and/or electronic equipment. Such electrical and/or electronic equipment can include, but is not limited to, electrical cables and/or electrical conductors. Examples of an electrical enclosure can include, but are not limited to, an electrical connector (or a portion thereof), a sleeve, and a conduit.

As described herein, a user can be any person that interacts with example under cabinet light fixtures. Examples of a user may include, but are not limited to, a consumer, an electrician, an engineer, a mechanic, a home owner, a business owner, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

Example embodiments of under cabinet light fixtures will be described more fully hereinafter with reference to the accompanying drawings, in which example embodiments of under cabinet light fixtures are shown. Under cabinet light fixtures may, however, be embodied in many different forms and should not be construed as limited to the example embodiments set forth herein. Rather, these example embodiments are provided so that this disclosure will be thorough and complete, and will fully convey the scope of under cabinet light fixtures to those of ordinary skill in the art. Like, but not necessarily the same, elements (also sometimes called components) in the various figures are denoted by like reference numerals for consistency.

Terms such as "first", "second", "third", "height", "width", "length" "distal", "proximal", "top", "bottom", "side", "left", and "right" are used merely to distinguish one component (or part of a component or state of a component) from another. Such terms are not meant to denote a preference or a particular orientation, and are not meant to limit embodiments of under cabinet light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
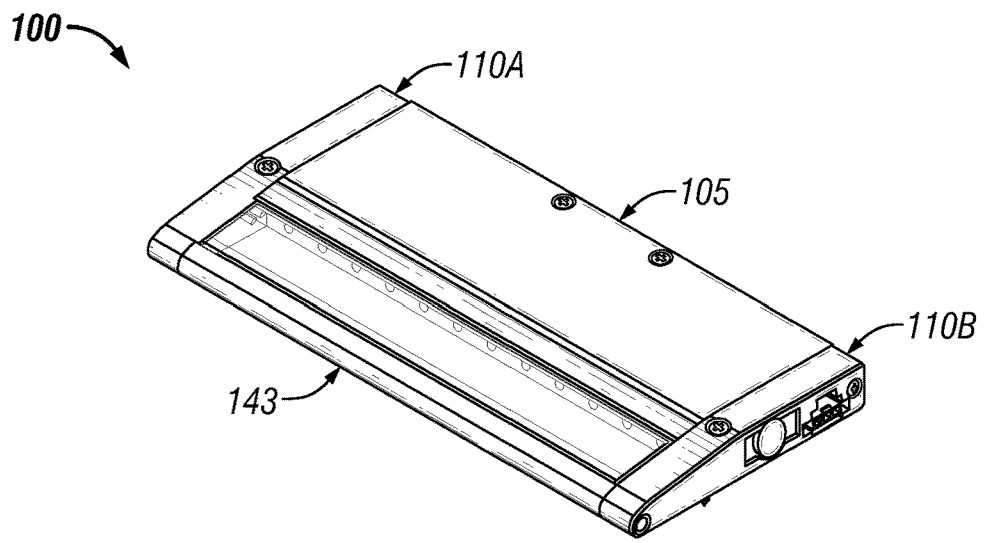
Figure 1C:
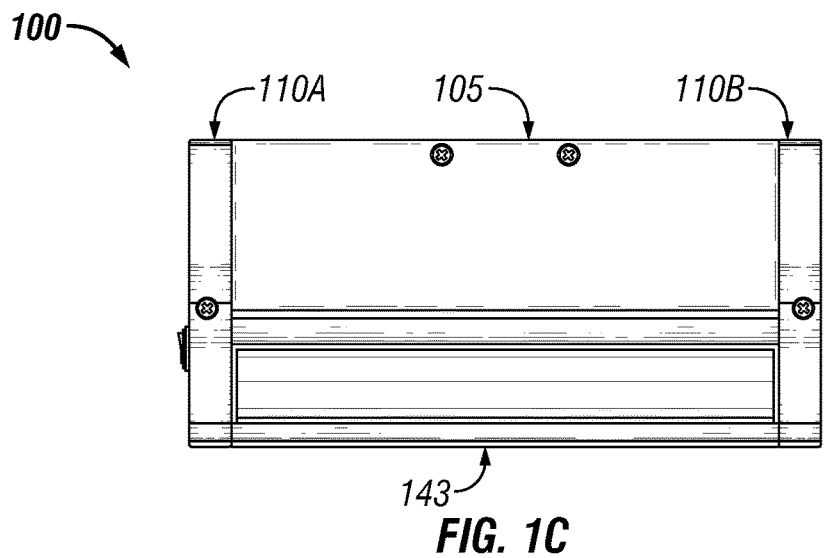

FIGS. 1A-1C show various views of an example under cabinet light fixture 100 in accordance with certain example embodiments. Specifically, FIGS. 1A and 1B each show a top-side perspective view of the under cabinet light fixture 100. FIG. 1C shows a bottom view of the light fixture 100. The example light fixture 100 includes a main housing 105, an end cap 110A coupled to one end of the main housing 105, another end cap 110B coupled to the opposite end of the main housing 105, and an light chamber 143. The end caps 110 are discussed in more detail below with respect to FIGS. 2A-13, and the light chamber 143 is discussed in more detail below with respect to FIG. 14. In certain example embodiments, the example cabinet light fixture 100 is designed to have minimal dimensions relative to under cabinet light fixtures currently known in the art. For example, the height of the light fixture 100 can be no greater than ¾ of an inch.

Figure 2A:
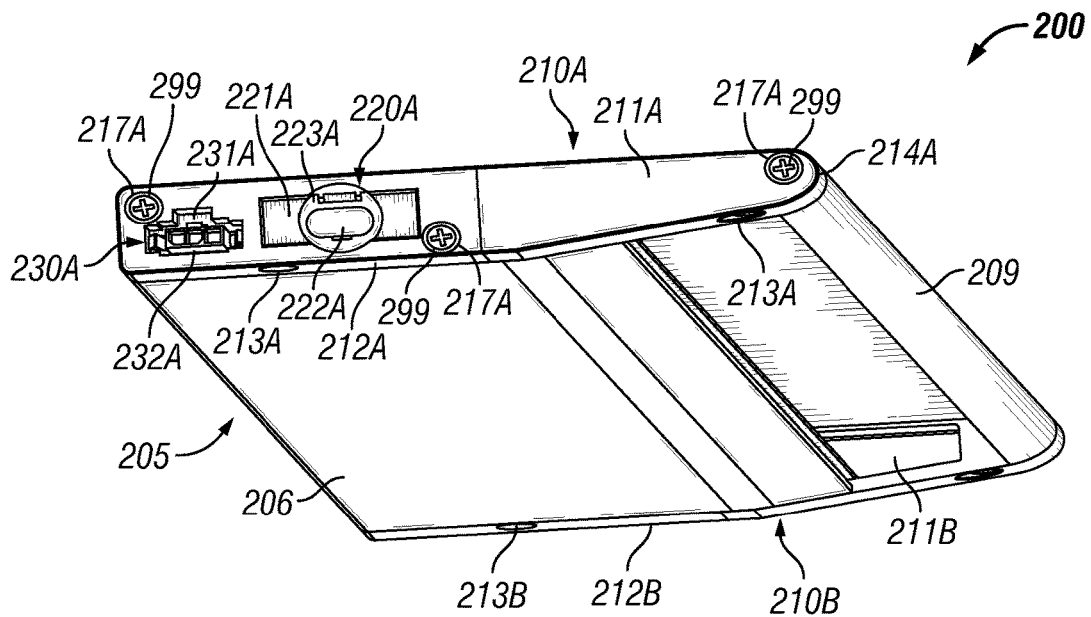
FIGS. 2A and 2B show various views of an under cabinet light fixture with an end cap in accordance with certain example embodiments.
Figure 2B:
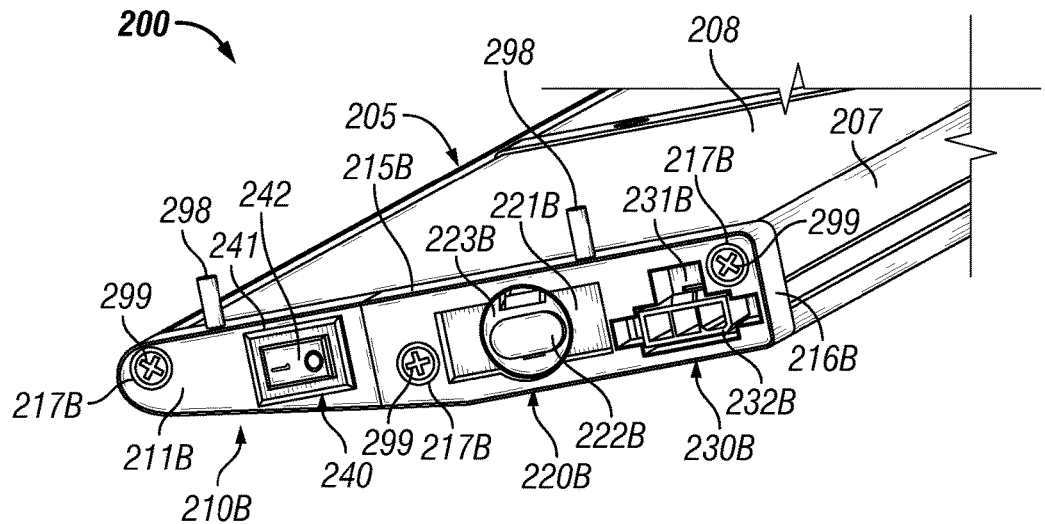

FIGS. 2A and 2B show various views of an under cabinet light fixture 200 with an end cap 210 in accordance with certain example embodiments. Specifically, FIG. 2A shows a bottom-side perspective view of the under cabinet light fixture 200, and FIG. 2B shows a top-side perspective view of the under cabinet light fixture 200. The main housing 205 of the under cabinet light fixture 200 is substantially the same as the main housing 105 of the under cabinet light fixture 100 described above. Referring to FIGS. 1A-2B, the under cabinet light fixture 200 can include one or more end caps 210. In this case, the under cabinet light fixture 200 of FIGS. 2A and 2B includes two end caps 210 (end cap 210A and end cap 210B).

End cap 210A and end cap 210B can be configured substantially similar to each other, but in a symmetrical orientation to account for one end cap (e.g., end cap 210A) being disposed on one end of the main housing 210, and the other end cap (e.g., end cap 210B) being disposed on the other end of the main housing 210. In other words, a description of any component of end cap 210A can be substantially the same as the corresponding component for end cap 210B. As a result, the description of such components shall be made without reference to the "A" or "B" version of the end cap 210.

Each end cap 210 can have a body that is defined by at least one wall. In this case, the body of each end cap 210 includes side wall 211, top wall 215, bottom wall 212, side wall 216, and side wall 214. Each wall of the body of an end cap 210 can have any suitable (based, for example, on the configuration of the end of the main housing 205 to which the end cap 210 couples) length, height, and thickness, which can each remain substantially constant or vary along another dimension of the end cap 210. In addition, each wall can be planar and/or three-dimensional. Further, each wall has an inner surface (facing inside the light fixture when the end cap 210 is coupled to the main housing 205) and an outer surface (facing away from the light fixture 200).

Each end cap 210 can also include one or more of a number of coupling features that perform one or more functions. For example, each end cap 210 can have multiple coupling features 217 that allow the end cap 210 to couple to the main housing 205 of the light fixture 200. In this case, the coupling features 217 are apertures that traverse the side wall 211 and receive another coupling feature 299 (in this case, a fastening device, such as a screw). As another example of a coupling feature included with each end cap 210, each end cap 210 can have multiple coupling features 213 that allow the light fixture 200 to couple to a mounting structure (e.g., an under surface of a cabinet). In this case, the coupling features 213 are apertures that traverse the bottom wall 212 and the top wall 215 and receive another coupling feature 298 (in this case, a fastening device, such as a screw or bolt).

An example end cap 210 can also include one or more features that allow power, control, and/or communication signals to enter into and/or leave the under cabinet light fixture 200. For example, an end cap 210 can include one or more features (e.g., knockouts, apertures) that can receive one or more electrical enclosures. In this case, each end cap 210 has an area 220 disposed on the side wall 211, where the area 220 includes feature 221 (in this example, a knockout 221), feature 222 (in this example, a knockout 222), and feature 223 (in this example, a knockout 223).

A knockout in this case is part of the end cap 220 (in this case, the side wall 211) that can be removed by a user to create an aperture of a shape and size, defined by the knockout, that traverses the side wall 211. For example, the outline of the knockout can be stamped or otherwise machined so that, with the application of an inward and/or outward force to the knockout by the user, the knockout separates from (is removed from) the rest of the end cap 210, leaving an aperture having the shape and size of the knockout.

Here, if feature 222 (knockout 222) is removed from the side wall 211 by a user, an aperture is formed. This aperture has a shape and size that is substantially the same as the shape and size a certain type of electrical enclosure (e.g., conduit, electrical connector end, sleeve). Similarly, if feature 223 (knockout 223) is removed from the side wall 211 by a user, a different aperture is formed. This different aperture has a shape and size that is substantially the same as the shape and size a certain type of electrical enclosure.

In certain example embodiments, when an area 220 has multiple features (e.g., knockouts), those features can overlap, at least in part, with each other. For example, as shown in FIGS. 2A and 2B, feature 222 is entirely contained within feature 223. Similarly, feature 223 is partially contained within feature 221, and feature 222 is entirely contained within feature 221. In some cases, rather than a knockout, a feature can be a recessed area, a protrusion, an aperture, and/or some other feature suitable for securing an electrical connection for the light fixture 200. For example, as described in FIGS. 10A-10C below, feature 221 can be a recessed area that helps secure a coupling feature 1090 (e.g., a bracket).

In some cases, an end cap 210 can have more than one area with features that allow power, control, and/or communication signals to enter into and/or leave the under cabinet light fixture 200. For example, in this case, in addition to area 220, area 230 is also disposed on the side wall 211, adjacent to area 220, of each end cap 210. As shown in FIGS. 2A and 2B, area 230 includes one feature 231, which in this case is an aperture 231 that traverses the side wall 211. Inside of the aperture 231 in this case is disposed an electrical enclosure 232 in the form of an end of an electrical connector. The aperture 231 can be pre-formed or can be the result of a knockout that has been separated (removed) from the rest of the end cap 220 by a user. In this case, area 230 is located adjacent to the side wall 216 of the end cap 210, and area 220 is located between area 230 and the side wall 214 of the end cap 210.

One end cap can have different and/or additional features and/or components compared to the other end cap of the light fixture 200. For example, end cap 210B includes a power control module 240 that is not included with end cap 210A. The power control module 240 can include a base 241 disposed on the side wall 211B and a switch 242 disposed on the base 241. The switch 242 can be toggled between two or more states by a user to control power signals delivered to the light fixture 200.

Figure 3:
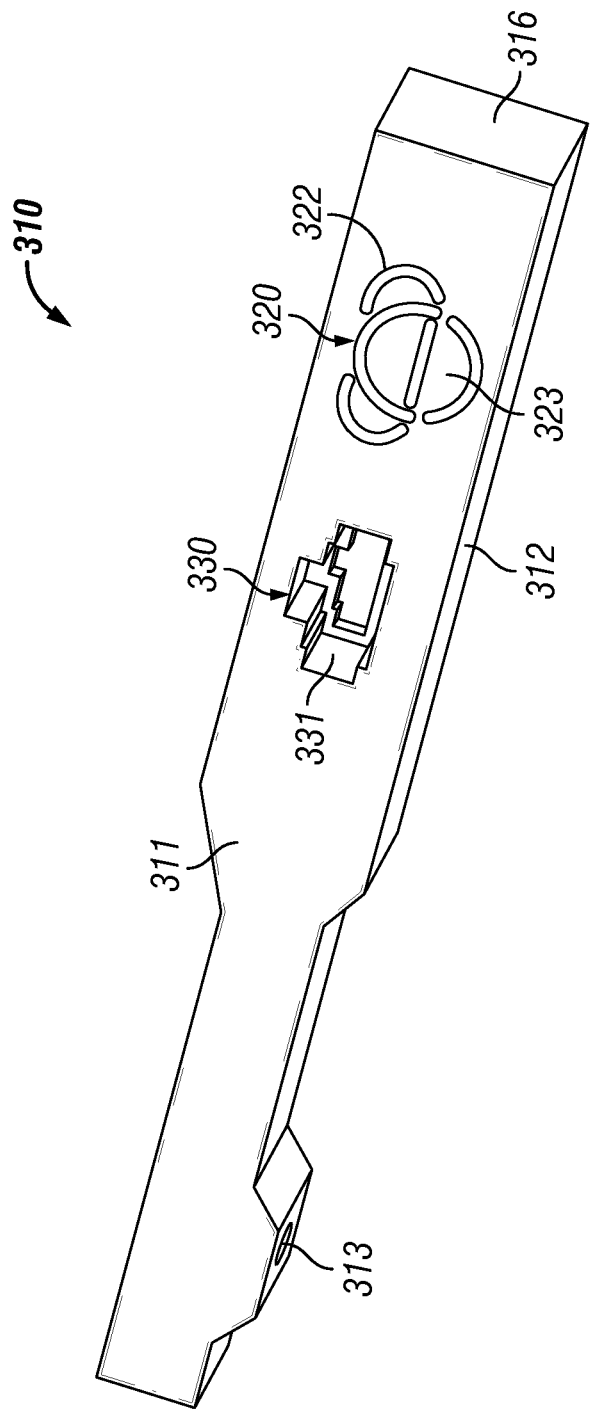
FIG. 3 shows a side perspective view of an example end cap in accordance with certain example embodiments.

FIG. 3 shows a side perspective view of another end cap 310 in accordance with certain example embodiments. The end cap 310 of FIG. 3 is substantially the same as the end caps 210 of FIGS. 2A and 2B, except as described below. Specifically, the orientation of area 320 and area 330 of the end cap 310 is reversed relative to the orientation of area 220 and area 230 of the end caps 210. In this case, area 320 is located adjacent to the side wall 316 of the end cap 310, and area 330 is located between area 320 and the side wall 314 of the end cap 310.

Figure 4A:
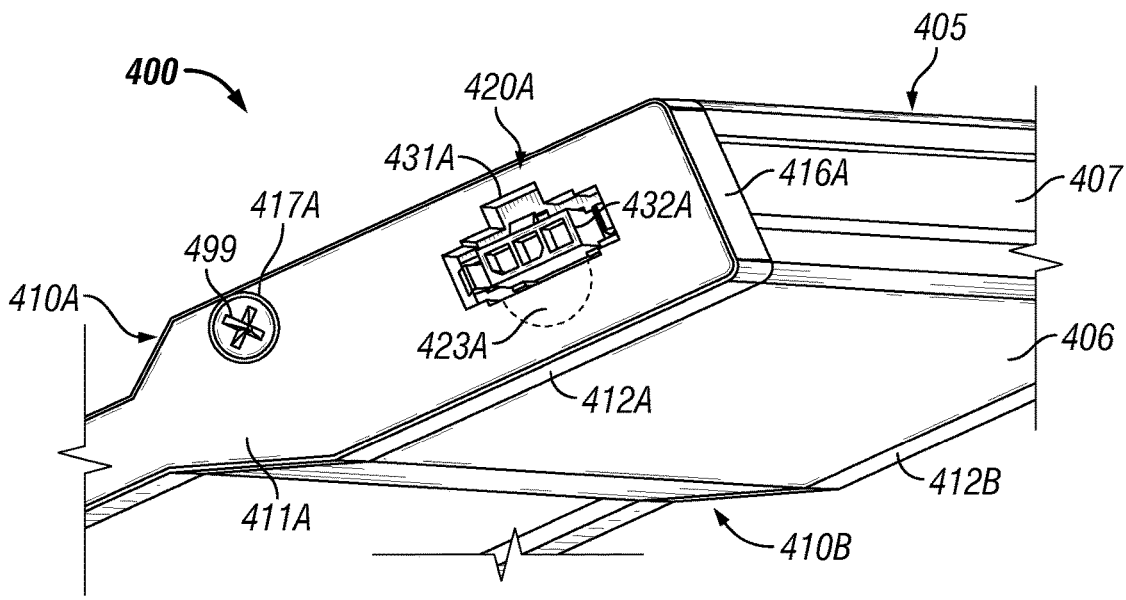
FIGS. 4A-4C show various views of yet another under cabinet light fixture with end caps in accordance with certain example embodiments.
Figure 4B:
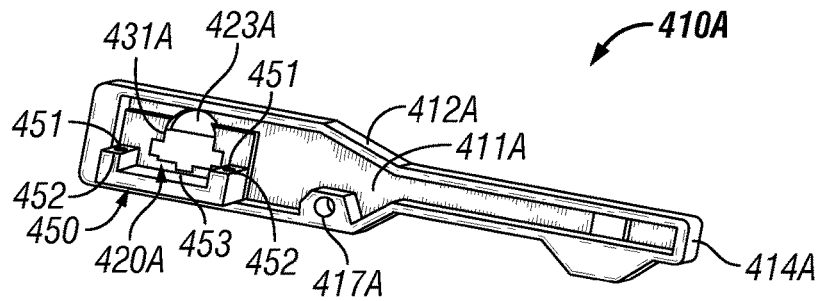
Figure 4C:
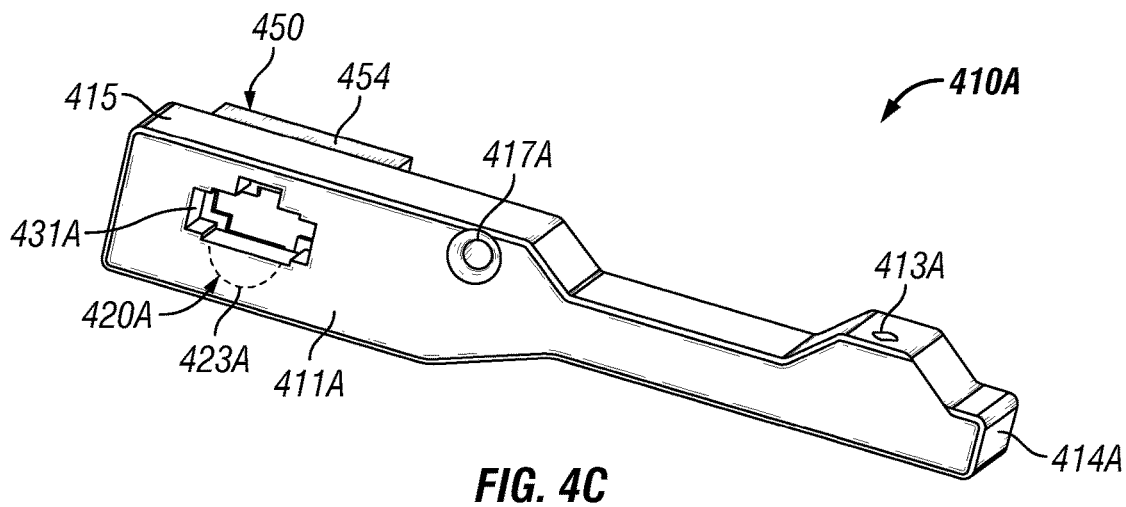

FIGS. 4A-4C show various views of yet another under cabinet light fixture 400 with end caps (e.g., end cap 410A) in accordance with certain example embodiments. FIG. 4A shows a bottom-side perspective view of the light fixture 400. FIG. 4B shows a top-side perspective view of the outer surfaces of the end cap 410A. FIG. 4C shows a top-side perspective view of the inner surfaces of the end cap 410A. The end cap 410A of FIGS. 4A-4C is substantially the same as the end caps 210 of FIGS. 2A and 2B and the end cap 310 of FIG. 3, except as described below.

In this case, there is only one area 420A with features that allow power, control, and/or communication signals to enter into and/or leave the under cabinet light fixture 400. The area 420A is disposed on the side wall 411A of the end cap 410A. As shown in FIGS. 4A-4C, area 420A includes feature 431A, which in this case is an aperture 431A that traverses the side wall 411A. The aperture 431A can be pre-formed or can be the result of a knockout that has been separated (removed) from the rest of the end cap 420A by a user. The area 420A also includes feature 423A, which is a knockout 423A that overlaps with (is superimposed with) part of the aperture 431A.

The end caps 410 of FIGS. 4A-4C also include a platform 450 disposed on the inner surface of the side wall 411A. The platform 450 can be located adjacent to one or more of the features of the area 420A. For example, in this case, the platform 450 is located below the aperture 431A and the knockout 423A. The platform 450 can have a shape, size, location, and/or other characteristics that allow the platform 450 to receive a clamping assembly (described below). For example, as shown in FIG. 4B, the platform 450 can include an elongated base 453 with vertical extensions 452 that extend upward at each end of the base 453.

Also, one or more coupling features 451 (in this case, threaded apertures) can be disposed on one or more portions (in this case, in the top surfaces of the extensions 452) of the platform 450 to allow the clamping assembly to couple to the platform 450. The particular configuration (e.g., size, shape, location) of the platform 450 can vary based on one or more of a number of factors, including but not limited to the configuration of the clamping assembly, the number of features in the area, the configuration (e.g., size, shape, position) of each feature in the area, and the location of other components of the light fixture 400 within the main housing 405.

Figure 5A:
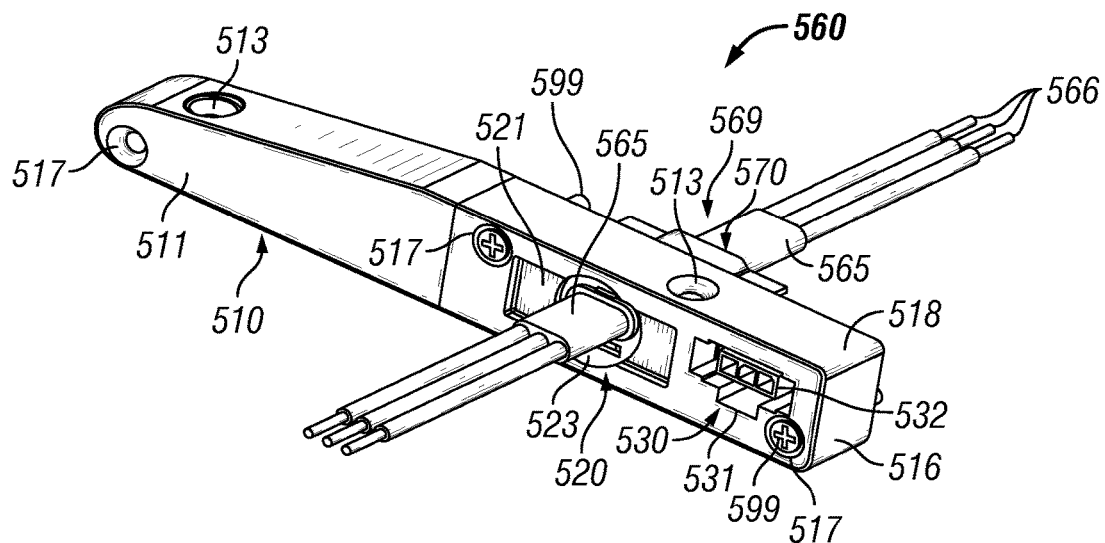
FIGS. 5A and 5B show an end cap receiving an electrical enclosure in accordance with certain example embodiments.
Figure 5B:
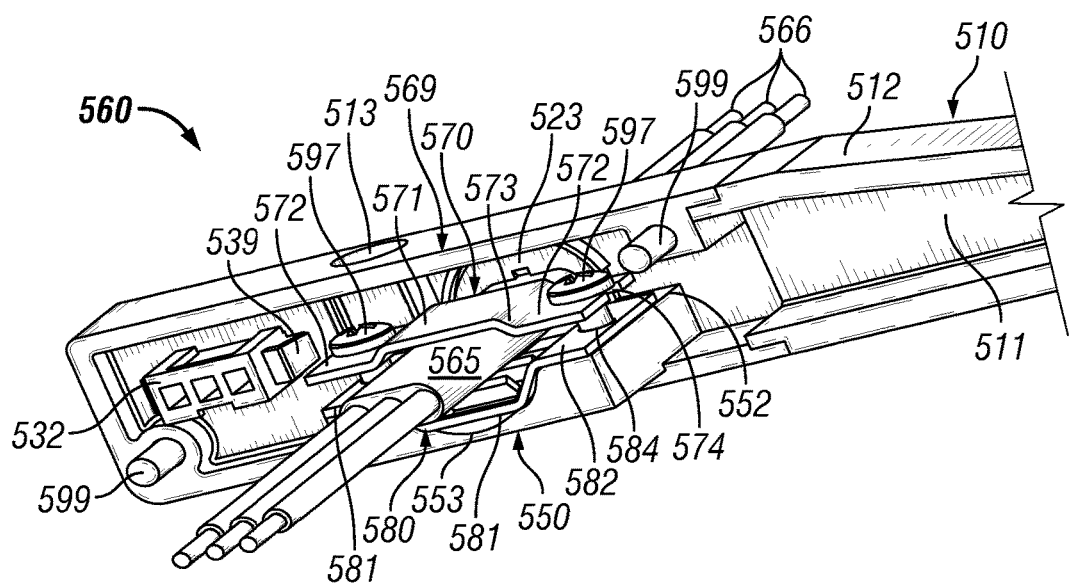

FIGS. 5A and 5B show an assembly 560 that includes an end cap 510 receiving an electrical enclosure 565 in accordance with certain example embodiments. FIG. 5A shows a top-side perspective view of the outer surfaces of the end cap 510. FIG. 5B shows a top-side perspective view of the inner surfaces of the end cap 510. The end cap 510 of FIGS. 5A and 5B is substantially the same as the end caps 210 of FIGS. 2A and 2B.

Referring to FIGS. 1A-5B, the assembly 560 of FIGS. 5A and 5B include a clamping assembly 569. A clamping assembly, such as the clamping assembly 569 of FIGS. 5A and 5B, can include one or more components. In this case, the clamping assembly 569 includes two clamping devices (clamping device 570 and clamping device 580) that are used in conjunction with each other to secure one or more portions of the electrical enclosure 565. In this case, the electrical enclosure 565 can be a sleeve, such as a Romex® connector. (Romex is a registered trademark of Southwire Company, a Delaware corporation with a main address at One Southwire Drive, Carrollton, Ga. 30119.) The electrical enclosure 565 can have one or more of a number of electrical conductors disposed therein. In this case, there are three electrical conductors 566 disposed in and protected by the electrical enclosure 565.

The clamping devices can have a shape and size that are based one or more of a number of factors, including but not limited to the shape and size of one or more portions of the electrical enclosure 565 and the shape and size of the platform 550. Clamping device 570 and clamping device 580 can have substantially the same, or a different, shape and/or size as each other. Further, clamping device 570 and clamping device 580 can be oriented in any way with respect to each other. In this case, clamping device 570 and clamping device 580 are oriented as mirror images of each other.

Clamping device 570 in this case is a bracket that has a central portion 571, two end portions 572 positioned on either side of the central portion 571, and a transition portion 573 positioned between the central portion 571 and one of the end portions 572. Clamping device 570 can include one or more coupling features to allow the clamping device 570 to be secured against a portion of the electrical connector 565. In this case, clamping device 570 has two coupling features 574 in the form of apertures that traverse each end portion 572. The central portion 571 is vertically offset from the end portions 572, and the end portions 572 are substantially planar with each other. The clamping device 570 is orientated such that the central portion 571 is raised relative to the end portions 572. The central portion 571 abuts against a top surface of the electrical enclosure 565 to help secure the electrical enclosure 565.

Similarly, clamping device 580 in this case is a bracket that has a central portion 581, two end portions 582 positioned on either side of the central portion 581, and a transition portion 583 positioned between the central portion 581 and one of the end portions 582. Clamping device 580 can include one or more coupling features to allow the clamping device 580 to be secured against the electrical connector 565. In this case, clamping device 580 has two coupling features 584 in the form of apertures that traverse each end portion 582. The central portion 581 is vertically offset from the end portions 582, and the end portions 582 are substantially planar with each other. The clamping device 580 is orientated such that the central portion 581 is recessed relative to the end portions 582. The central portion 581 abuts against a bottom surface of the electrical enclosure 565 to help secure the electrical enclosure 565.

The platform 550 is shaped and sized to accommodate clamping device 580. Specifically, the length and width of the elongated base 553, the height and width of the vertical extensions 552, and the location and configuration of the coupling features (hidden from view) disposed in the vertical extensions 552 allow clamping device 580 and clamping device 570 to become coupled to the platform 550 using one or more coupling features 597 (in this case, two screws). In addition, when clamping device 570 and clamping device 580 are coupled to the platform 550 in this way, and when the electrical connector 565 is disposed between the central portion 571 of clamping device 570 and the central portion 581 of clamping device 580, the electrical enclosure 565 can be secured as required to ensure operational integrity and/or based on one or more applicable standards.

FIG. 5B also shows a detail of how electrical enclosure 532 of area 530 is secured within aperture 531. In this case, there is a coupling feature 539 in the form of a clip disposed on either side of the electrical enclosure 532 and attached to the inner surface of the side wall 511 of the end cap 510.

Figure 6A:
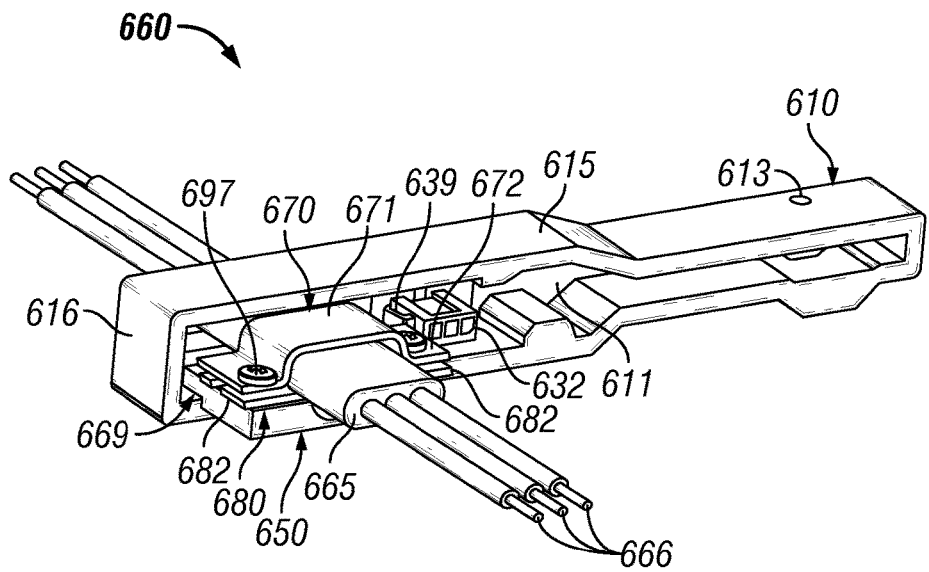
FIGS. 6A and 6B show another end cap receiving an electrical enclosure in accordance with certain example embodiments.
Figure 6B:
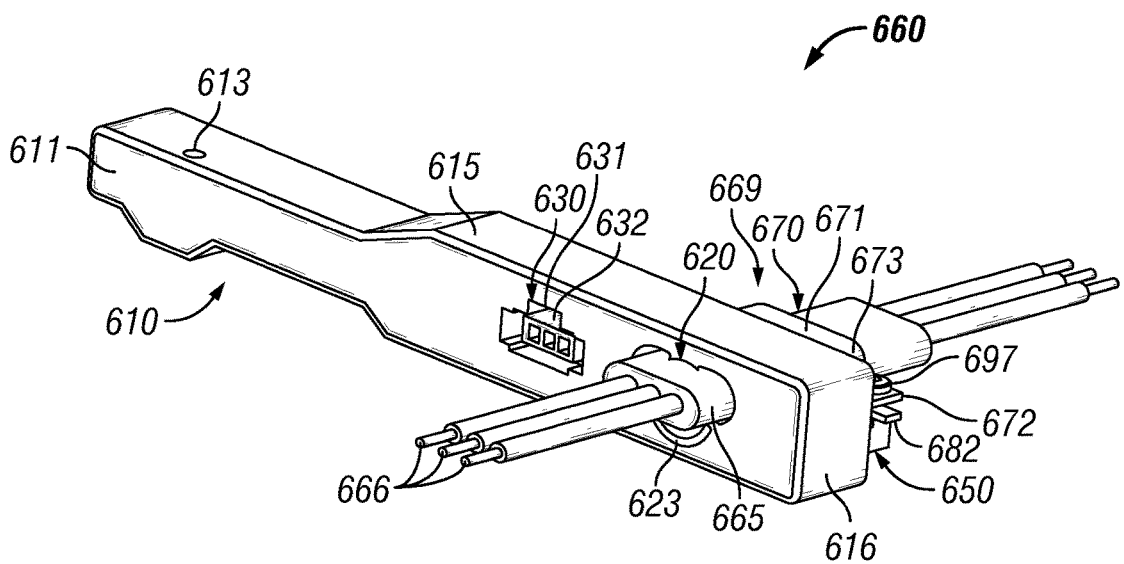

FIGS. 6A and 6B show an assembly 660 that includes another end cap 610 receiving an electrical enclosure 620 in accordance with certain example embodiments. FIG. 6A shows a top-side perspective view of the inner surfaces of the end cap 620 of the assembly 660. FIG. 6B shows a top-side perspective view of the outer surfaces of the end cap 620 of the assembly 660. The end cap 610 of FIGS. 6A and 6B is substantially the same as the end caps 310 of FIG. 3. Further, the electrical enclosure 665, the platform 650, and the clamping assembly 669 of FIGS. 6A and 6B are substantially the same as the electrical enclosure 565, the platform 550, and the clamping assembly 569 of FIGS. 5A and 5B described above.

Figure 7A:
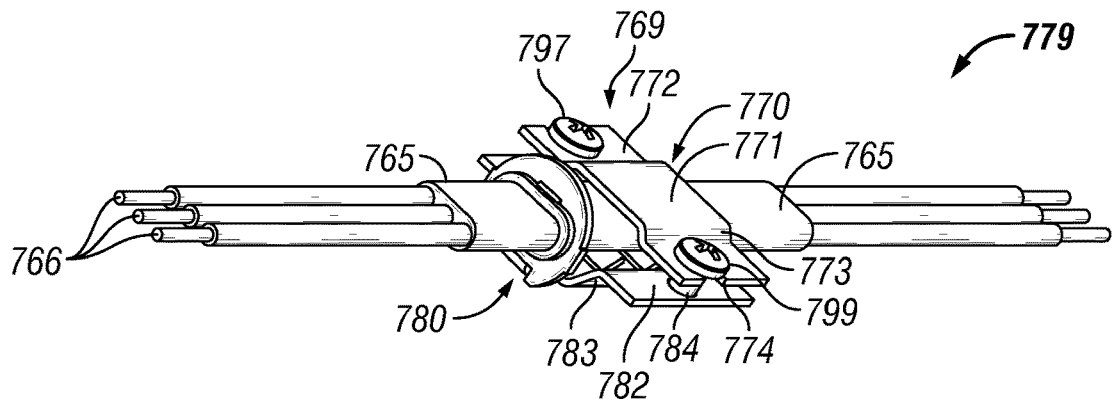
FIGS. 7A-7C show a clamping assembly and an electrical enclosure in accordance with certain example embodiments.
Figure 7B:
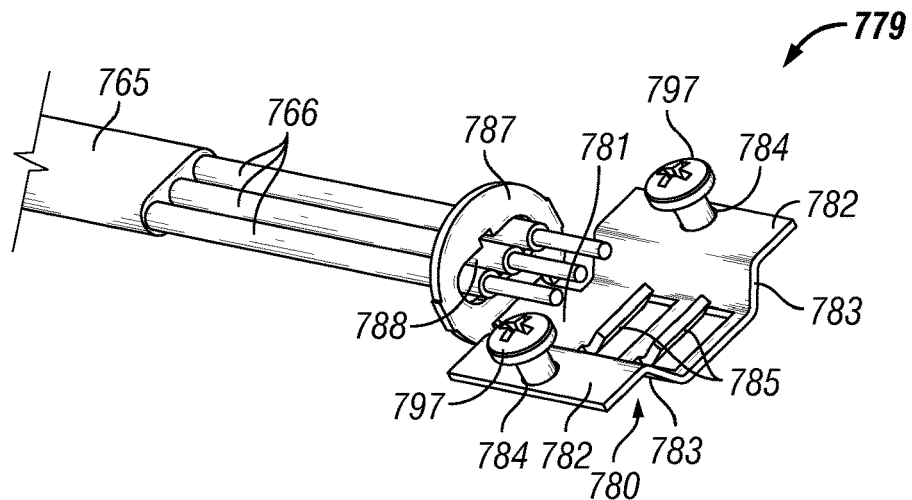
Figure 7C:
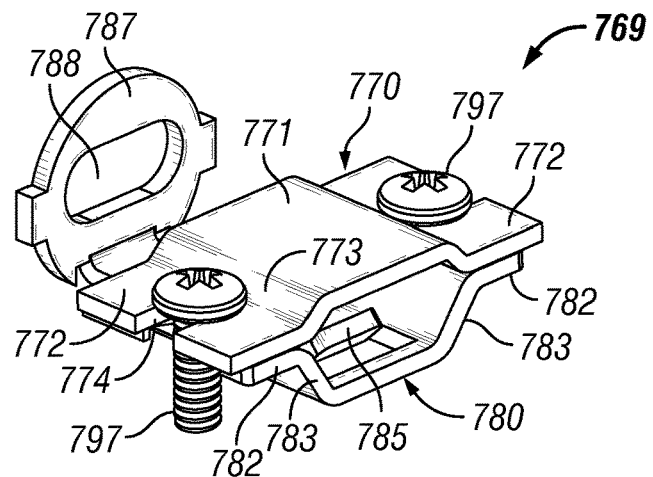

FIGS. 7A-7C show an assembly 779 that includes a clamping assembly 769 and an electrical enclosure 765 in accordance with certain example embodiments. FIG. 7A shows a top-side perspective view of the clamping assembly 769 of the assembly 660. FIG. 7B shows a top-side perspective view of a portion of the clamping assembly 769 of the assembly 660. FIG. 7C shows a top side perspective view of the clamping assembly 769. The electrical enclosure 765 and the clamping assembly 769 of FIGS. 7A-7C are substantially the same as the electrical enclosure 565 and the clamping assembly 569 of FIGS. 5A and 5B, except as described below.

The clamping device 780 of the clamping assembly 769 of FIGS. 7A-7C includes a number of additional features relative to the clamping device 580 of the clamping assembly 569 of FIGS. 5A and 5B. Specifically, the clamping device 780 can include one or more retaining features 785 that extend upward from the central portion 781. The retaining features 785 abut against a portion (in this case, the bottom surface) of the electrical enclosure 765 and can have a shape and orientation to keep the electrical enclosure 765 from moving in a certain direction. For example, as shown in FIGS. 7B and 7C, the retaining features 785 form an obtuse angle with the central portion 781 (pointing away from the end cap to which the clamping assembly 769 is coupled), which prevents the electrical enclosure 765 from being pulled through the end cap and out of the light fixture.

In such a case, the retaining features 785 can help the light fixture comply with one or more applicable standards. For example, UL 1598 is a standard that requires, among other things, that electrical conductors (e.g., electrical conductors 766) that couple to an under cabinet light fixture can withstand a pull force of up to 30 pounds and remain coupled to the light fixture. The retaining features 785, configured as shown in FIGS. 7A-7C, prevent the electrical enclosure 765 from being pulled away from the light fixture unless the pull force applied to the electrical conductors 766 is greater than the threshold force required under UL 1598.

In certain example embodiments, features such as the retaining features 785 can be disposed on one or more other elements of the clamping assembly 769. For example, the central portion 771 of the clamping device 770 can include one or more retaining features. In addition, or in the alternative, the platform (for example, the top surface of the base) of the end cap can include one or more retaining features.

Another additional feature of the clamping device 780 of FIGS. 7A-7C is a collar 787. The collar 787 extends from an end of the central portion 781 and is oriented substantially perpendicular to the central portion 781. The collar 787 in this case has an aperture 788 that traverses the collar 787. The aperture 788 has a shape and size that is substantially the same as (or slightly larger than) the shape and size of the electrical enclosure 765. In such a case, the electrical enclosure 765 can be positioned within the aperture 788.

Also, the outer perimeter of the collar 787 can have a shape and size that is substantially the same as (or slightly smaller than) the shape and size of the knockout that is removed from the end cap. In such a case, the collar 787 can be positioned within the aperture in the end cap that results after the knockout is removed. In this way, the collar 787 can act as an adapter to allow a number of different electrical enclosures to be disposed in an aperture in an end cap that results from the removal of a single knockout. When the collar 787 is disposed in an aperture in an end cap, the collar 787 can help reduce or eliminate one or more elements (e.g., dust, water, grease) outside the under cabinet light fixture from entering the under cabinet light fixture. This feature can allow the light fixture 100 to meet a UL standard and/or an equivalent standard that prohibits any exterior portion (e.g., the end cap 110) of the light fixture 100 from having holes.

Figure 8:
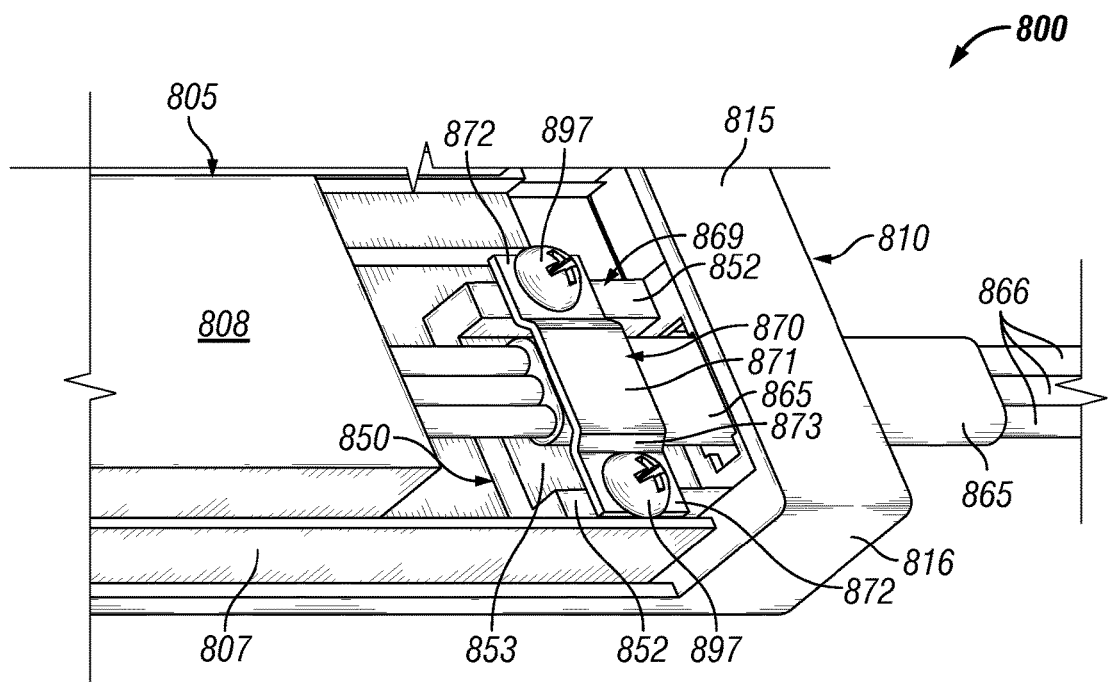
FIG. 8 shows a portion of an under cabinet light fixture in accordance with certain example embodiments.

FIG. 8 shows a portion of an under cabinet light fixture 800 in accordance with certain example embodiments. In this case, the under cabinet light fixture 800 includes a main housing 805, an end cap 810, an electrical enclosure 865, and a clamping assembly 869. The main housing 805 and the end cap 810 can be substantially similar to the main housing 205 and the end caps 210 of FIGS. 2A and 2B, and an electrical enclosure 865 can be substantially similar to the electrical enclosure 565 of FIGS. 5A and 5B. Further, the platform 850 can be substantially similar to the platform 450 of FIGS. 4A-4C, and the clamping assembly 869 can be substantially similar to the clamping assembly 769 of FIGS. 7A-7C, except as described below.

In this case the clamping assembly 869 only includes a single clamping device 870, which is coupled directly to the extensions 852 of the platform 850 using coupling features 897. While there is no collar, one or more retaining features (hidden from view) can be disposed on the bottom surface of the central portion 871 of the clamping device 870 and/or on the top surface of the base 853 of the platform 850. In such a case, the clamping assembly 869 can prevent the electrical enclosure 865 from being pulled through the aperture in the end cap 810 to comply with UL 1598 and/or another applicable industry standard.

Figure 9:
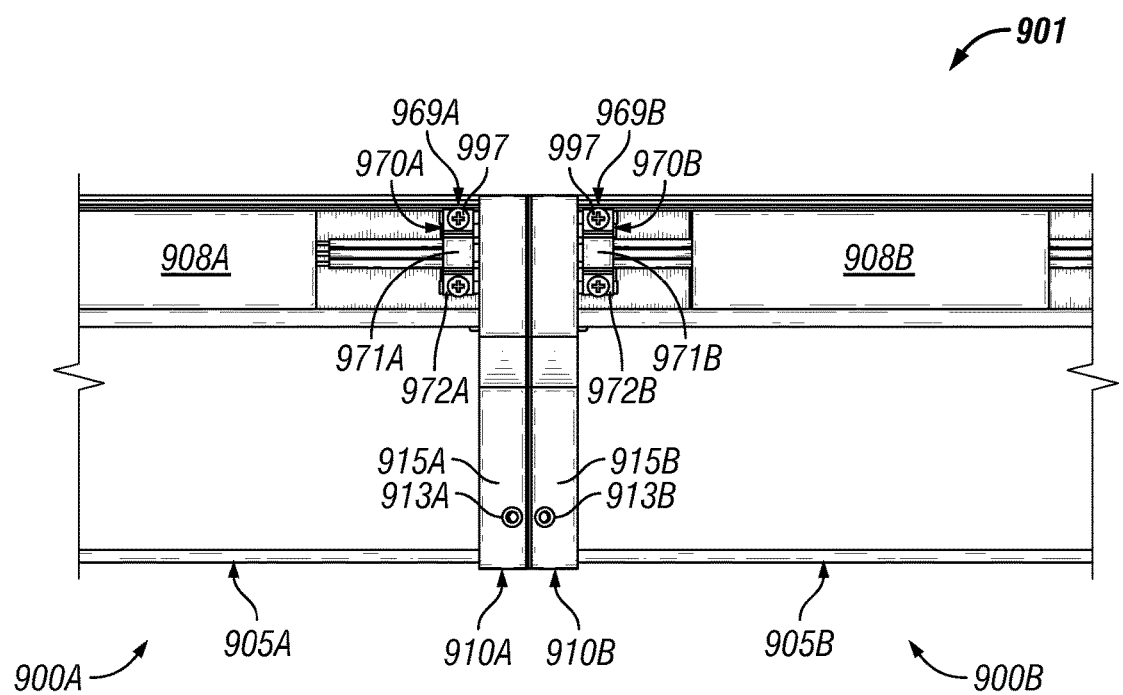
FIG. 9 shows a couple of under cabinet light fixtures coupled to each other in accordance with certain example embodiments.

FIG. 9 shows a bottom view of an assembly 901 of a couple of under cabinet light fixtures coupled to each other in accordance with certain example embodiments. Light fixture 900A and light fixture 900B are substantially similar to light fixture 800 of FIG. 8. The electrical enclosure (hidden from view) has one end that extends through end cap 910A and is secured by clamping assembly 969A, while the other end of the electrical enclosure extends through end cap 910B and is secured by clamping assembly 969B. In this configuration, light fixture 900A and light fixture 900B can abut against each other, so that end cap 910A abuts against end cap 910B.

Figure 10A:
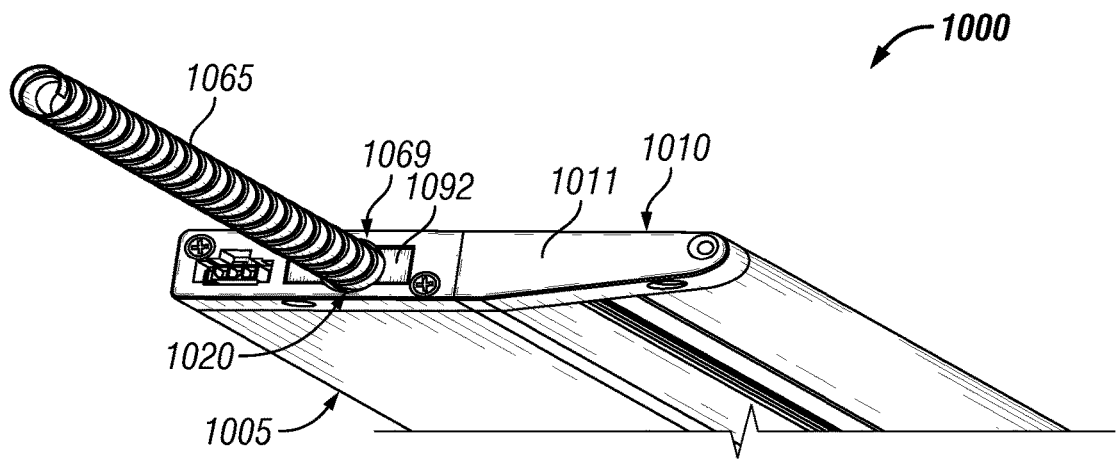
FIGS. 10A-10C show a portion of an under cabinet light fixture with another electrical enclosure in accordance with certain example embodiments.
Figure 10B:
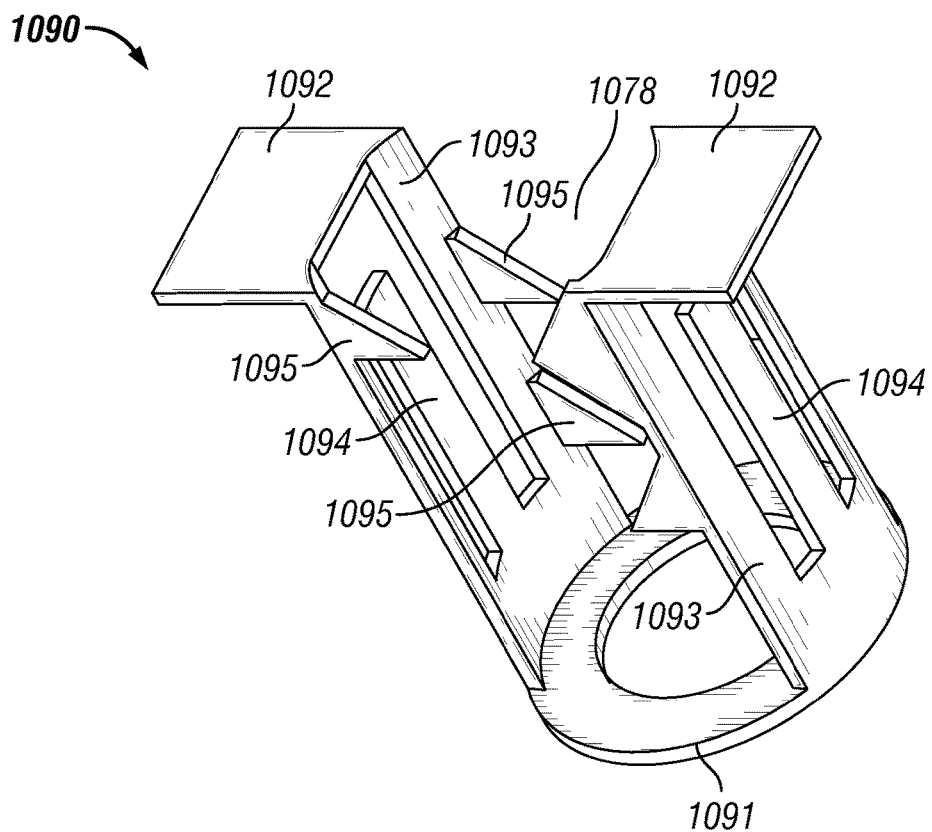
Figure 10C:
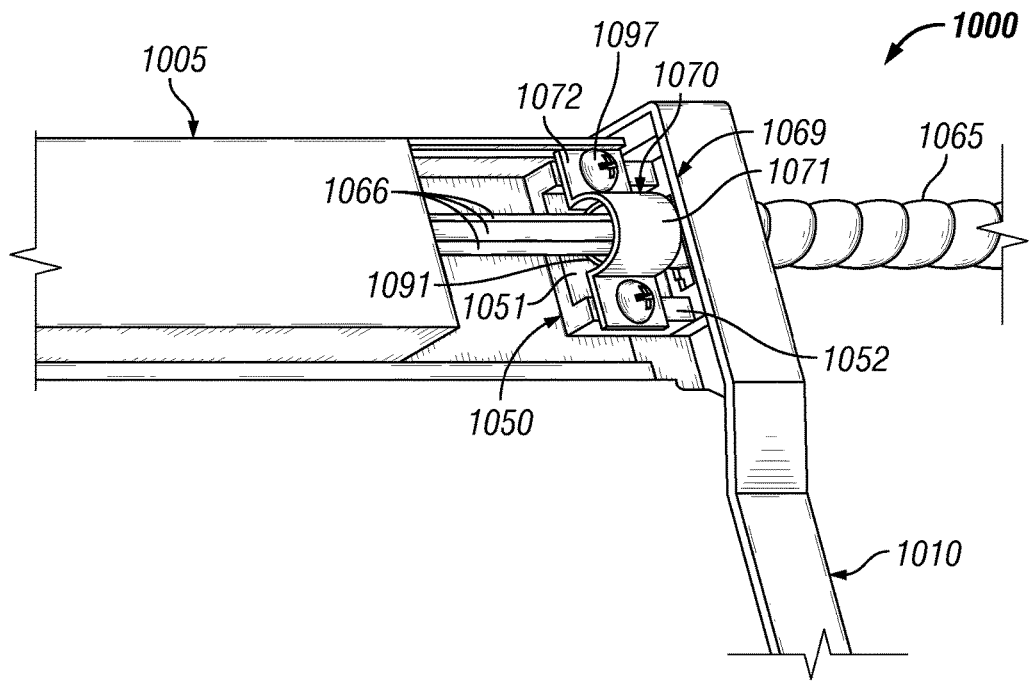

FIGS. 10A-10C show a portion of an under cabinet light fixture 1000 with another electrical enclosure 1088 in accordance with certain example embodiments. FIG. 10A shows a bottom-side perspective view of the light fixture 1000. FIG. 10B shows a perspective view of a clamping device 1090. FIG. 10C shows another bottom-side perspective view of the light fixture 1000. The light fixture 1000 of FIGS. 10A-10C is substantially similar to the light fixture 800 of FIG. 8, except as described below.

Referring to FIGS. 1A-10C, the electrical enclosure 1065 of the light fixture 1000 is a conduit (e.g., ⅜ inch steel flex) in this case. Since the shape and size of the electrical enclosure 1065 is different from the shape and size of the electrical enclosure 565 described above, a different knockout in the same or a different area of the end cap 1010 can be removed so that the resulting aperture in the end cap 1010 can receive the electrical enclosure 1065. Disposed within the electrical enclosure can be one or more electrical conductors 1066.

In addition, the clamping assembly 1069 of the light fixture 1000 can be configured differently than the clamping assembly 769 or the clamping assembly 869 described above. In this case, the clamping assembly 1069 can include clamping device 1070 and clamping device 1090. Clamping device 1070 can be substantially similar to clamping device 870 described above, except that the central portion 1071 is rounded to substantially mirror the curvature of the electrical enclosure 1065.

The clamping device 1090 includes one or more features designed to receive the shape and size of the electrical enclosure 1065. In this case, the clamping device 1090 includes a proximal base 1092 at one end, where the proximal base 1092 is disposed on either side of (or around) a cavity 1078 that traverses the length of the clamping device 1090. The proximal base 1092 can have a shape and size suitable to fit within a feature (e.g., a recess) in the outer surface of an area 1020 of the side wall 1011. Such a feature can be substantially the same, for example, as feature 221A of FIG. 2A.

A distal base 1091 is disposed at the other end of the clamping device 1090 and also surrounds, at least in part, the cavity 1078. The cavity can have a size and shape that accommodates the size and shape of the electrical enclosure 1065. Between the proximal base 1092 and the distal base 1091 are one or more side members (in this case, side members 1093, side members 1094). Some of these side members (e.g., side members 1093) can span completely between the proximal base 1092 and the distal base 1091, while other side members (e.g., side members 1094) can span only part of the way between the proximal base 1092 and the distal base 1091.

The clamping device 1090 can also include one or more retaining features 1095. The retaining features 1095 can be disposed on any one or more portions of the clamping device 1090. For example, in this case, the retaining features 1095 are disposed on the inner surface of the side members 1093. The retaining features 1095 can be configured to abut against the electrical enclosure 1065 and prevent the electrical enclosure 1065 from moving and/or being pulled in a certain direction. Similarly, side members 1094 can protrude outward slightly and abut against the inner surface of the side wall 1011, also helping to prevent the electrical enclosure 1065 from being pulled from inside the light fixture 1000 to outside the light fixture 1000.

Figure 11:
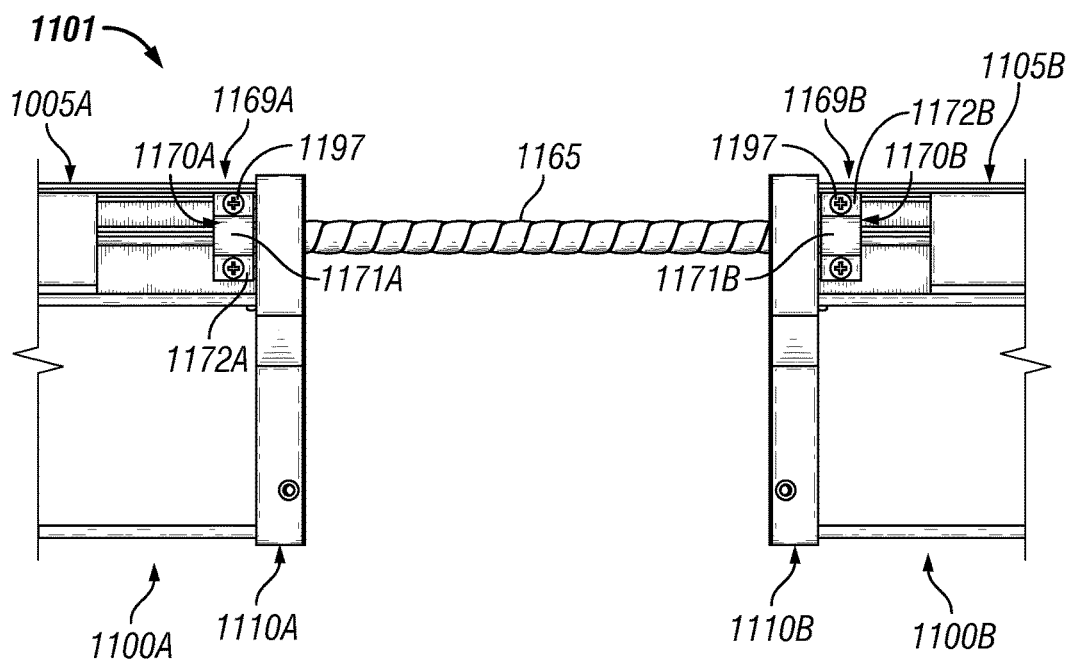
FIG. 11 shows a couple of under cabinet light fixtures coupled to each other in accordance with certain example embodiments.

FIG. 11 shows a bottom view of an assembly 1101 of a couple of under cabinet light fixtures coupled to each other in accordance with certain example embodiments. Light fixture 1100A and light fixture 1100B are substantially similar to light fixture 1000 of FIGS. 10A-10C. The electrical enclosure 1165 has one end that extends through end cap 1110A and is secured by clamping assembly 1169A, while the other end of the electrical enclosure 1165 extends through end cap 1110B and is secured by clamping assembly 1169B. In this configuration, light fixture 1100A and light fixture 1100B are separated from each other but retain electrical continuity by the electrical conductors disposed inside the electrical enclosure 1165.

Figure 12A:
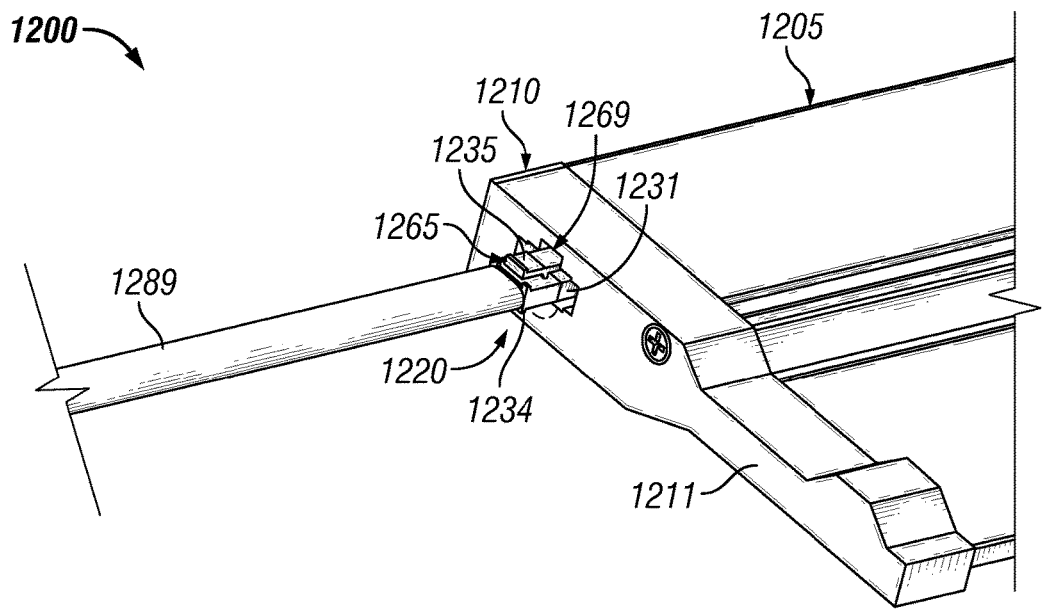
FIGS. 12A and 12B show a portion of an under cabinet light fixture with yet another electrical enclosure in accordance with certain example embodiments.
Figure 12B:
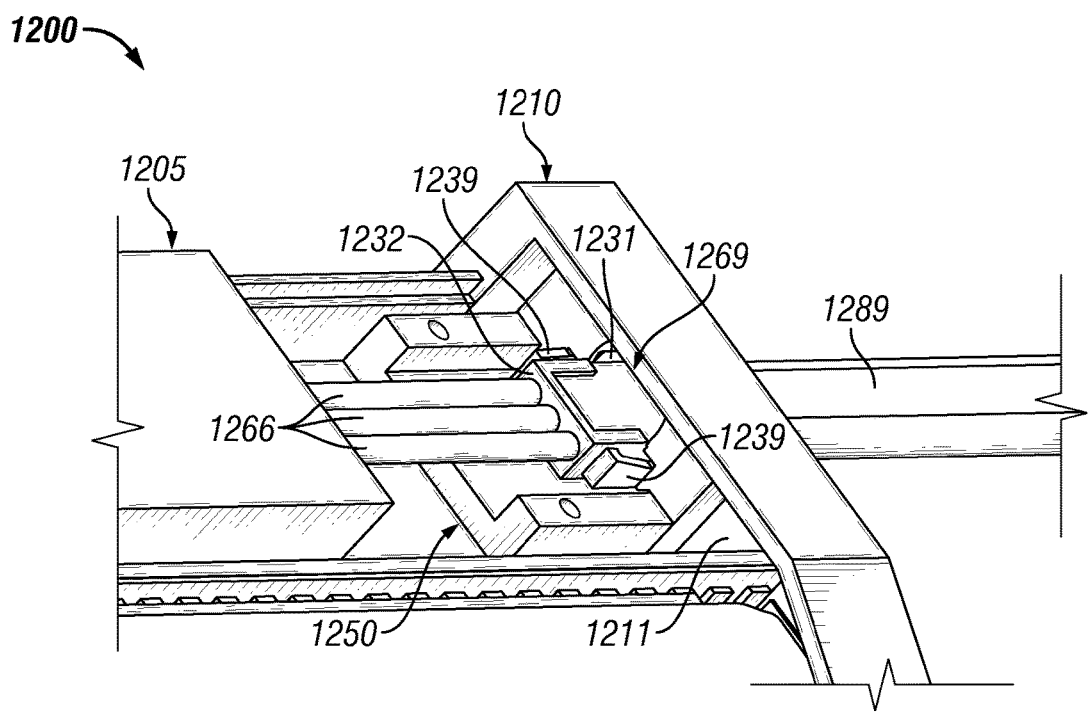

FIGS. 12A and 12B show a portion of an under cabinet light fixture 1200 with yet another electrical enclosure 1265 in accordance with certain example embodiments. The light fixture 1200 of FIGS. 12A and 12B is substantially similar to the light fixture 800 of FIG. 8, except as described below. The end cap 1210 of the light fixture 1200 is substantially similar to the end cap 410 of FIGS. 4A-4C in that there is only one area 1220. The electrical enclosure 1265 in this case is an end of an electrical connector that is configured to mate with the electrical enclosure 1232 disposed within aperture 1231.

In certain example embodiments, the electrical enclosure 1265 includes one or more features that help couple the electrical enclosure 1265 with one or more components (e.g., electrical enclosure 1232) of the light fixture 1200. For example, as shown in FIG. 12A, the electrical enclosure 1265 can include coupling feature 1235 that extend from the body 1234 of the electrical enclosure 1265. Each coupling feature 1235 can couple to a complementary coupling feature of the electrical enclosure 1232 (as in this case), the side wall 1211, and/or another component of the light fixture 1200.

The configuration of the electrical enclosure 1232 and the electrical enclosure 1265 can keep the electrical enclosure 1265 stationary, even when a pull force is applied, directly or indirectly, to the electrical enclosure 1265. These features (e.g., coupling feature 1235, coupling feature 1239) of the electrical enclosure 1232 and the electrical enclosure 1265 can, at least in part, be equivalent to the clamping assemblies described above. The electrical enclosure 1265 can be coupled to an electrical cable 1289, inside of which can be disposed one or more electrical conductors for carrying power and/or control signals.

FIG. 13 shows a bottom view of an assembly 1301 of a couple of under cabinet light fixtures coupled to each other in accordance with certain example embodiments. Light fixture 1300A and light fixture 1300B are substantially similar to light fixture 1200 of FIGS. 12A and 12B. One end of the electrical cable 1289 has an electrical enclosure (hidden from view) coupled to light fixture 1300A, and the other end of the electrical cable 1289 has another electrical enclosure 1265B coupled to light fixture 1300B. In this configuration, light fixture 1300A and light fixture 1300B are separated from each other but retain electrical continuity by the electrical conductors disposed inside the electrical cable 1289.

FIG. 14 shows a cross-sectional side view of an under cabinet light fixture 1400 with a light chamber 1443 in accordance with certain example embodiments. Referring to FIGS. 1A-14, the light chamber 1443 differs from light chambers used with under cabinet light fixtures in the current art in that indirect, rather than direct, lighting is used. Specifically, because the profile of the example under cabinet light fixture 1400 is so low (¾ of an inch or less) relative to currently-existing under cabinet light fixtures, direct lighting is not practical or feasible.

In certain example embodiments, the light chamber 1443 is part of the main housing 1405 of the light fixture 1400. The light chamber 1443 can include a cavity 1444 that is formed by one or more light modules 1445, at least one reflective surface 1448, and an opening that can optionally have a lens 1449 disposed therein. The components and/or configuration of each light module 1445 can vary. For example, as shown in FIG. 14, each light module 1445 can include one or more light sources 1447 mounted on one or more light source receivers 1446. Also, the number and/or layout of the light modules 1445 can vary.

Each light source 1447 can emit light into the cavity 1444 of the light chamber 1443. The reflective surface 1448 can be located adjacent to the light modules 1445. The reflective surface 1448 can be made of and/or coated with one or more of a number of reflective materials that are designed to reflect and/or otherwise manipulate the light emitted by the light sources 1447. When the reflective surface 1448 has a curvature or other non-linear (or non-planar) feature, more of the light emitted by each light source 1447 can be reflected off of the reflective surface 1448. If there is a wall between the opening and the bottom side of the light modules 1445, the wall can also be a reflective surface 1438. In such a case, the reflective surface 1438 can be substantially the same, at least in part, as the reflective surface 1448. The reflective surface 1438 may be planar (not have a curvature).

In certain example embodiments, the opening (covered by the lens 1449 in FIG. 14) can be located adjacent to the reflective surface 1448. The light emitted by the light sources 1447 can travel through the opening (or the lens 1449 disposed in the opening), where most of the light is reflected at least one time in the cavity 1444 before reaching the opening of the light chamber 1443. The lens 1449 can be removable and/or replaceable. The lens 1449 (also known by other names, such as optical device) can have one or more features that allow the light that leaves the cavity 1444 of the light chamber 1443 to be manipulated in one or more of any of a number of ways.

Example embodiments can be installed without complicated electrical and/or mechanical manipulation or expertise. In other words, many issues common to installing a lighting fixture (e.g., having sufficient light coverage, having light fixtures that are so large as to be in the way of a user after installation, hiring an electrician) can be avoided or minimized using example under cabinet light fixtures. Using example embodiments described herein, the light fixture can be more energy efficient, provide particular types of lighting, have optical features that can be easily changed at some point in the future by a user, and provide a number of other benefits expressed or implied herein.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An end cap for a light fixture, the end cap comprising:
 a body comprising at least one wall and at least one coupling feature, wherein the at least one wall comprises an inner surface and an outer surface, and wherein the at least one coupling feature is configured to couple the body to another component of the light fixture;
 a first knockout disposed in the at least one wall, wherein the first knockout is configured to be removed to generate a first aperture in the at least one wall, wherein the first aperture, which results after the first knockout is removed, would be configured to receive a first electrical enclosure;
 a platform disposed on and extending away from the inner surface of the at least one wall adjacent to the first knockout, wherein the platform is configured to receive a clamping assembly, wherein the clamping assembly is configured to secure the first electrical enclosure within the first aperture, which results after the first knockout is removed, wherein the first electrical enclosure comprises a sleeve through which a cable is disposed after the first knockout is removed and the first electrical enclosure is secured by the clamping assembly adjacent to the first aperture; and
 a second aperture disposed in the at least one wall, wherein the second aperture is configured to receive a second electrical enclosure.

2. The end cap of claim 1, wherein the light fixture is an under cabinet light fixture.

3. The end cap of claim 1, wherein the first electrical enclosure is a conduit.

4. The end cap of claim 1, further comprising:
 a second knockout disposed in the at least one wall, wherein the second knockout is configured to be removed to generate a third aperture in the at least one wall, wherein the third aperture, which results after the second knockout is removed, would be configured to receive a third electrical enclosure.

5. The end cap of claim 4, wherein the second knockout is superimposed with at least a portion of the first knockout.

6. The end cap of claim 1, wherein the first electrical enclosure is configured to receive at least one electrical conductor.

7. The end cap of claim 6, wherein the platform comprises at least one retention feature that further prevents the first electrical enclosure from being moved toward the outer surface of the at least one wall.

8. An under cabinet light fixture, comprising:
a main housing comprising a housing body;
a first end cap disposed on a first end of the main housing, the first end cap comprising:
an endcap body comprising at least one wall and at least one coupling feature, wherein the at least one wall comprises an inner surface and an outer surface, and wherein the at least one coupling feature is coupled to the housing body of the main housing;
a first knockout disposed in the at least one wall, wherein the first knockout is configured to be removed to generate a first aperture in the at least one wall, wherein the first aperture would be configured to receive a first electrical enclosure; and
a second aperture disposed in the at least one wall, wherein the second aperture is configured to receive a second electrical enclosure; and
a light chamber disposed within the housing body of the main housing, wherein the light chamber is formed by a side wall, a curved top wall disposed adjacent to the side wall, and a bottom opening disposed adjacent to the side wall and the curved top wall, wherein the light chamber comprises:
at least one light module disposed on the side wall of the light chamber, wherein each light module of the at least one light module comprises at least one light source; and
at least one reflective surface disposed on the curved top wall of the light chamber, wherein the at least one reflective surface defines at least an upper portion of the light chamber,
wherein at least a portion of light emitted by the at least one light source is reflected off the at least one reflective surface through the bottom opening and into an ambient environment outside the main housing.

9. The under cabinet light fixture of claim 8, wherein the first electrical enclosure comprises an electrical connector end.

10. The under cabinet light fixture of claim 9, wherein the first end cap further comprises a second knockout disposed in the at least one wall, wherein the second knockout is configured to be removed to generate a third aperture in the at least one wall.

11. The under cabinet light fixture of claim 10, further comprising:
a third electrical enclosure that would be disposed in the third aperture that results after the second knockout is removed from the first end cap.

12. The under cabinet light fixture of claim 8, wherein the first end cap further comprises a platform disposed on the inner surface of the at least one wall adjacent to the first knockout.

13. The under cabinet light fixture of claim 12, further comprising:
a clamping assembly coupled to the platform, wherein the clamping assembly secures an electrical feature disposed in one selected from a group consisting of the first aperture and the second aperture, and wherein the clamping assembly prevents the electrical feature from being moved toward the outer surface of the at least one wall.

14. The under cabinet light fixture of claim 8, further comprising:
a second end cap disposed on a second end of the main housing, wherein the second end of the main housing is opposite the first end of the main housing, wherein the second end cap comprises features substantially similar to those of the first end cap.

* * * * *